(12) United States Patent
Schneider et al.

(10) Patent No.: US 10,795,990 B2
(45) Date of Patent: Oct. 6, 2020

(54) SECURE CODE OPTIMIZATION METHOD AND SYSTEM

(71) Applicant: ABB Schweiz AG, Baden (CH)

(72) Inventors: Johannes Schneider, Feldkirch (AT); Matus Harvan, Luxembourg (LU); Sebastian Obermeier, Rietheim (CH); Thomas Locher, Zürich (CH); Yvonne-Anne Pignolet, Zürich (CH)

(73) Assignee: ABB Schweiz AG, Baden (CH)

( * ) Notice: Subject to any disclaimer, the term of this patent is extended or adjusted under 35 U.S.C. 154(b) by 52 days.

(21) Appl. No.: 16/102,045

(22) Filed: Aug. 13, 2018

(65) Prior Publication Data

US 2019/0005233 A1 Jan. 3, 2019

Related U.S. Application Data

(63) Continuation of application No. PCT/EP2017/052905, filed on Feb. 9, 2017.

(30) Foreign Application Priority Data

Feb. 12, 2016 (EP) .................................. 16155473
Apr. 20, 2016 (EP) .................................. 16166255

(51) Int. Cl.
*G06F 21/54* (2013.01)
*G06F 21/14* (2013.01)
(Continued)

(52) U.S. Cl.
CPC ............... *G06F 21/54* (2013.01); *G06F 8/30* (2013.01); *G06F 21/125* (2013.01); *G06F 21/14* (2013.01);
(Continued)

(58) Field of Classification Search
CPC ........ G06F 21/54; G06F 21/125; G06F 21/14; G06F 21/602; G06F 8/30;
(Continued)

(56) References Cited

U.S. PATENT DOCUMENTS 10,153,894 B2 * 12/2018 Laine ...................... H04L 9/008
2004/0003278 A1 * 1/2004 Chen ........................ G06F 21/14
726/21

(Continued)

FOREIGN PATENT DOCUMENTS

EP 1376310 A2 1/2004
WO WO-2014117668 A1 * 8/2014 ............. G06F 21/12

OTHER PUBLICATIONS

Michael S. Ware, et al., Securing Java Code: Heuristics and an Evaluation of Static Analysis Tools, Jun. 2008, SAW '08 Jun. 12, 2008, Tucson, Arizona, USA, pp. 1-10.*

(Continued)

*Primary Examiner* — Farid Homayounmehr
*Assistant Examiner* — Raied A Salman
(74) *Attorney, Agent, or Firm* — J. Bruce Schelkopf; Taft Stettinius & Hollister LLP (57) ABSTRACT

A method of automatically generating secure code includes: receiving source code and security constraints for the source code, the security constraints encoding, to what extend a variable in the source code is considered secure; and generating secure code from the source code and the security constraints by replacing non-secure operations in the source code, which operate on the variables considered as secure, with secure operations; wherein a secure operation is an operation, which, when applied to at least one encrypted variable, generates an encrypted result, which, when decrypted, is the result of the non-secure operation applied to the not encrypted variable.

18 Claims, 3 Drawing Sheets

(51) Int. Cl.
*G06F 21/12* (2013.01)
*G06F 8/30* (2018.01)
*G06F 21/60* (2013.01)
*H04L 9/00* (2006.01)

(52) U.S. Cl.
CPC ............ *G06F 21/602* (2013.01); *H04L 9/008* (2013.01); *G06F 2221/033* (2013.01); *G06F 2221/0748* (2013.01)

(58) Field of Classification Search
CPC ....... G06F 2221/033; G06F 2221/0748; G06F 7/483; H04L 9/008; H04L 2209/125; G09C 1/00
See application file for complete search history.

(56) References Cited

U.S. PATENT DOCUMENTS

| | | | | |
|---|---|---|---|---|
| 2005/0114616 | A1* | 5/2005 | Tune | G06F 12/1441 711/163 |
| 2006/0259764 | A1* | 11/2006 | Asal | G06F 9/30054 713/166 |
| 2009/0172329 | A1* | 7/2009 | Paver | G06F 12/1491 711/163 |
| 2009/0307308 | A1* | 12/2009 | Siegemund | G06F 8/443 709/203 |
| 2010/0205673 | A1* | 8/2010 | Burrell | G06F 21/577 726/25 |
| 2011/0116624 | A1* | 5/2011 | Farrugia | H04L 9/002 380/28 |
| 2013/0259226 | A1* | 10/2013 | Ciet | H04L 9/0631 380/44 |
| 2014/0372769 | A1* | 12/2014 | Kerschbaum | H04L 9/008 713/189 |
| 2015/0089243 | A1* | 3/2015 | Veugen | H04L 9/008 713/190 |
| 2016/0117155 | A1* | 4/2016 | Salmon-Legagneur | G06F 21/14 717/156 |
| 2016/0301958 | A1* | 10/2016 | Srinivasan | H04N 21/23476 |
| 2016/0352511 | A1* | 12/2016 | Bashyam | G06F 21/602 |
| 2018/0375652 | A1* | 12/2018 | Karame | H04L 9/30 |

OTHER PUBLICATIONS

Towson, Best Practices for Secure Variables, http://cis1.towson.edu/~cssecinj/modules/other-modules/build-the-lab/build-the-lab-lab-module-3/, May 2014, pp. 1-3.*

Salvador Cavadini, Secure Slices of Insecure Programs, https://dl.acm.org/doi/pdf/10.1145/1368310.1368329, Mar. 2008, pp. 112-122.*

European Patent Office, International Preliminary Report on Patentability issued in corresponding Application No. PCT/EP2017/052905, dated May 24, 2018, 24 pp.

European Patent Office, Written Opinion of the International Preliminary Examining Authority issued in corresponding Application No. PCT/EP2017/052905, dated Feb. 28, 2018, 6 pp.

European Patent Office, International Search Report & Written Opinion issued in corresponding Application No. PCT/EP2017/052905, dated May 19, 2017, 12 pp.

European Patent Office, Extended Search Report & Written Opinion issued in corresponding Application No. 16166255.6, dated May 19, 2017, 6 pp.

* cited by examiner

SECURE CODE OPTIMIZATION METHOD AND SYSTEM

FIELD OF THE INVENTION

The invention relates to the field of encryption and of software adapted for processing at least partially encrypted data. In particular, the invention relates to a method for automatically generating secure code and/or for protecting code with obfuscation, a method for evaluating source code to be secured, a code security optimization program and to a code security optimization system.

BACKGROUND OF THE INVENTION

Every organisation has different degrees of confidentiality requirements for different kinds of information. Information may not also mean data, but also may mean algorithms, i.e. the way, how data is processed. This application deals with data and algorithm that may be processed in remote, third-party infrastructures, e.g. a cloud computing facility.

In a cloud environment, data and analytic algorithms may be susceptible to theft: If the cloud infrastructure is hacked, an attacker can steal the algorithms. Insider attacks may be also a real threat, e.g., people working for the cloud provider stealing sensitive information.

For securing data, homomorphic encryption schemes and multi-party computation schemes may be used, which allow to perform computation on encrypted data. Existing source code, e.g., written in C or C# extended with special security commands, may sometimes be compiled so that it runs automatically on multiple parties using encrypted values. However, compilers typically are only able to handle programs of limited complexity, e.g., they may not handle loops with confidential stopping conditions, and they may produce code that can be exorbitantly slow to execute.

Furthermore, secure code usually has very high engineering costs, in particular when security should be traded for performance. A software engineer usually has to go through the code, manually trace dependencies among variables to derive confidentiality constraints, investigate the performance of code branches with/without encrypted values etc.

A typical solution to keep an algorithm confidential is to obscure the algorithm in such a way that it becomes difficult to figure out its purpose and functionality. However, such obfuscation may not solve the problem satisfactorily as the functioning of the algorithm may still be observed and analysed, even to the point where the whole algorithm and its parameters are reconstructed.

DESCRIPTION OF THE INVENTION

It is an objective of the invention to facilitate and/or to automate the engineering and generation of secure code, while constraints on the code in terms of performance and/or confidentiality requirements for individual components may be addressed.

This objective is achieved by the subject-matter of the independent claims. Further exemplary embodiments are evident from the dependent claims and the following description.

An aspect of the invention relates to a method of automatically generating secure code. In the following, the term "code" may relate to source code, i.e. code readable by a human being, or byte code or machine code, i.e. code directly processable by a computing device, for example on a virtual machine or a processor. Secure code may be code that is processing encrypted data and/or that is secured with respect to analysing, how the algorithm encoded in the code is processing data. Secure code may be source code, byte code or machine code. In general, secure code may be code that is written and/or generated to withstand attacks.

According to an embodiment of the invention, the method comprises: receiving source code and security constraints for the source code, the security constraints encoding, whether a variable in the source code and/or to what extent the variable is considered secure; and generating secure code from the source code and the security constraints by replacing non-secure operations in the source code, which operate on the variables considered as secure, with secure operations; wherein a secure operation is an operation, which, when applied to at least one encrypted variable, generates an encrypted result, which, when decrypted, is the result of the non-secure operation applied to the not encrypted variable.

It may be seen as a gist of the invention that not all variables, but only a subset of the variables used in the source code are processed with secure operations. The security constraints, which, for example, may comprise a list of variables, which should be considered as secure, encode, whether a variable should be processed in a secure way or not and/or to what extent the variable is considered as secure. In such a way, performance of the secure code may be increased. The extent, to which a variable may be considered as secure, may refer to a confidentiality domain of the variable, i.e. a range in which a value of the variable has to be secured. The extent, to which a variable may be considered as secure, may also refer to obfuscating control structures, the variable is used in, i.e. in obfuscating control structures, that depend on the value of the variable and/or that may modify the value of the variable.

The source code may be written without any knowledge and/or reference to the secure operations. For example, when the source code is processed, every addition in the source code may be replaced with a secure addition, when at least one of the variables is considered as secure by the security constraints.

In general, an operation may be a singular operation, a function, a subroutine, code fragment, etc., which, when applied to one or more variables, changes the value of one or more of the variables and/or calculates a value that may be assigned to a variable.

A secure operation may be an operation, such as addition, multiplication, division, etc., on one or more encrypted input variables, which, when applied to the encrypted variables, generates an encrypted result variable. When the result variable is decrypted, the result is the same as the ordinary, non-secure operation would have been applied to the unencrypted input variables.

A non-secure operation may be an operation that is performed on plaintext, i.e. unencrypted variables.

For example, the secure operations may be based on homomorphic encryption, such as the additively homomorphic Paillier cryptosystem.

According to another example, the secure operations may be based on multi-party encryption. Here, every variable may be encrypted with a separate key. The encryption scheme is such that the encrypted variables and the keys may be processed with the same operations separately from each other and that the encrypted result of the secure operations applied to the encrypted variables may be decrypted with the result of further secure operations applied to the keys. When the encrypted variables and the keys are processed in different, for example remote, computing device, neither provider of the computing devices may gain knowledge about the content of the processed data.

As an example, the method may be performed by a compiler, which receives the source code and the security constraints, for example in a data file, such as an XML file. The compiler may then replace the unsecure operations with secure operations, when necessary, which, for example, may be provided in a library. The resulting secure code may be another source file, or may be byte code or machine code.

According to an embodiment of the invention, the security constraints encode, whether operations executed on variables considered as secure are to be obfuscated; wherein, when generating secure code, not obfuscated operations in the source code which operate on the variables considered as secure, with obfuscated operations; wherein an obfuscated operation is an operation, which, when applied to input variables of the not obfuscated operation and an additional encrypted input variable, generates a same result as the not obfuscated operation for a special value of the additional input variable.

It has to be noted that an additional input variable also may be an encrypted constant that is part of the code, such as source code and/or compiled code.

Furthermore, the security constraints may encode that specific parts of the algorithm in the source code are to be obfuscated, such that a person trying to analyse the secure code has high difficulties in recognizing the algorithm encoded into the secure code. Similarly to the usage of encrypted operations, also the obfuscation may be controlled via variables, which are declared as secure.

It has to be noted that the term "obfuscation" in this context does relate to a concealing of the algorithm beyond a reaming of variables and changing an order of operations. For the obfuscation of an operation, an additional encrypted input variable is provided, which is included into the operations on the other encrypted variables. Furthermore, the operations are modified in such a way, that the encrypted input variable is also used during the operations, however in such a way, that the correct result is calculated for specific values of the additional input variable. For example, the operations on the input variables may be modified with a multiplication with the additional input variable, and thus will give the correct result, when the additional input variable is 1. Since the additional input variable is encrypted, it is not possible or at least much harder to guess, how the algorithm encoded in the secure code is working.

More general, when an operation is to be obfuscated, one or more misleading and/or junk operations may be generated, and the obfuscated operation may be generated from the correct operation and the junk operation(s) such that with one or more additional encrypted input variables, each of which may be a binary variable, the correct operation may be selected.

According to an embodiment of the invention, the security constraints encode, whether a control structure in the source code is considered secure, a control structure being adapted for executing a part of a code based on a condition on a variable; wherein, when generating secure code, the not secured control structure in the source code is replaced with a secure control structure, the secured control structure additionally being based on the condition of the variable, which is encrypted.

Not only variables, but also control structures may be declared as secure. In this case, the control structure may be replaced with a secured control structure, which operates on an encrypted condition.

In general, a condition may be true or false. For example, a simple condition is that a variable is smaller than a threshold value. It may be possible that a condition for a control structure is calculated with encrypted variables.

It also may be possible, that the condition is calculated in a further computing device, such as a client device, which decrypts the secured variables used in the condition, calculates the condition and encrypts the result. In any case, it is not possible to guess the value of the condition from the secure code. In another embodiment, the client device does not compute but only decrypts the result of the condition. A server device may compute the condition in an encrypted way, which may result in an encrypted true or false, sends the encrypted condition to the client device and the client device may return true or false to the server device.

Since the condition is encrypted, also the corresponding control structure may have to be modified and may have to be replaced with a secured control structure. For example, the secured control structure may comprise additional codes, which send encrypted variables to another computing device, which evaluates the condition and/or calculates the encrypted condition.

In particular, the security constraints may encode, whether specific control structures should be secured or not. Security may be traded off with respect to performance. For example, tests on error conditions may not be secured, which very seldom may branch into the clause to be executed in the case of an error.

According to an embodiment of the invention, the control structure is an "if then else" structure and the secure control structure is based on multiplying a then-clause with the encrypted condition and/or an else-clause with an encryption of 1 minus the condition. In this case, the secure control structure will generate the correct encrypted result, although it is not possible to see, which clause would have been evaluated, when the control structure would not have been secured.

According to an embodiment of the invention, the control structure is a repeating control structure adapted for repeating an operation, when the condition is true; wherein the secured repeating control structure sends a request to a client, adapted for decrypting the condition, and for deciding, whether the repeating control structure should be stopped; wherein the security constraints encode, how often the operation is repeated, until the request to the client is sent.

Another possibility for a control structure is a repeating control structure, such as a while- or for-loop. To prevent a third party from guessing, how often the repeating control structure has been repeated, and thus, the values used in the condition, the secured repeating control structure may be repeated a fixed number of times, before the clients test, whether the repeating control structure should be left. The higher the fixed number, the higher the security and the higher the performance costs. Thus, by setting the fixed number, security may be traded off with respect to performance.

According to an embodiment of the invention, the encrypted repeating control structure is repeating an encrypted operation, the encrypted operation being based additionally on the encrypted condition, wherein the encrypted operation generates a same result as the operation to be repeated, when the condition is true, and the encrypted condition not changing input variables, when the condition is false. Similarly to the "if then else" structure, the body of the repeating control structure may be secured in such a way that a third party cannot guess, whether the breaking condition is true or false.

According to an embodiment of the invention, the security constraints encode a confidentiality domain for at least one of the variables in the source code; wherein, when generating secure code, an operation in the source code, which operates on a variable with a confidentiality domain is replaced with a confidentiality domain operation; wherein a confidentiality domain operation comprise the non-secure operation and a corresponding secure operation and the confidentiality domain operation is adapted to request from a client adapted for decrypting the variable, whether the variable is in the confidentiality domain and in this case for executing the secure operation on the encrypted variable and otherwise for executing the non-secure operation on the decrypted variable.

A further possibility to trade off performance with respect to security is to perform encrypted operations only, when the corresponding variables have values in specific confidentiality domains. A confidentiality domain may be a range or may comprise several ranges for the corresponding variable. When the value of the variable is in the one or more ranges, the variable should be treated secure and otherwise not.

One solution to this, is to ask a secure client, whether the variable, or its value, is in the confidentiality domain. When the variable is not in the confidentiality domain, the client may also provide the decrypted variable. Depending on the result determined by the client, the secure operations may be performed on the encrypted variables or the non-secure operations may be performed on the decrypted variables, which in the end may be encrypted by the client again.

In general, the secure code may comprise several parts that may be executed on different computing devices, which may be communicatively interconnected.

According to an embodiment of the invention, the secure code comprises a client part to be executed on a client, wherein the client part is adapted for receiving input data, encrypting variables in the input data, which variables are considered as secure, and to send the partially encrypted input data to a server. The client may be considered as secure but may have limited computing capabilities. The server may be considered as unsecure but may have a large amount of computing capabilities. For example, the server may be a part of a cloud computing facility.

The secure code comprises a server part to be executed on at least one server, wherein the server part is adapted to receive the partially encrypted input data, to process the partially encrypted input data based on the secure operations and to send the processed data back to the client. For example in the case of multi-party encryption, the client may send the at least partially encrypted input data to one server and the used keys to a further server. The client part of the secure code may comprise further functionality for decrypting the processed data into result data.

Furthermore, the client part may comprise functionality for evaluating secure conditions as described above and/or for testing confidentiality domains as described above.

A further aspect of the invention relates to a method for evaluating source code to be secured. Since the method for generating source code may be performed automatically, i.e. by a computing device without the aid of a human being, it also may be used for evaluating source code in combination with security constraints.

According to an embodiment of the invention, the method comprises: receiving source code, security constraints for the source code, and input data for the source code; generating not secure code from the source code; generating secure code from the source code and the security constraints as described in the above and in the following; and executing the not secure code and the secure code on the input data and determining a performance penalty of the security constraints by comparing the runtime of the not secure code and the secure code.

The security constraints may encode, which variables are to be considered as secure, confidentiality domains for variables, which parts of the source code should be obfuscated, and/or which control structures should be secured.

With the method, for a specific source code and a specific set of security constraints, the performance penalty for securing the source code with the security constraints may be determined. In a first step, the source code may be compiled into ordinary, not secure code and may be executed on specific input data. In a second step, the source code may be compiled into secure code as specified in the security constraints and also may be executed on the input data. The not secure code and the secure code may be executable code such as byte code or machine code. In both cases, the runtimes of the two versions of the code may be measured and their difference may be calculated. The difference of the two runtimes may be seen as a performance penalty for the security constraints.

According to an embodiment of the invention, the method further comprises: receiving source code, security priorities for the source code, input data for the source code and a maximal performance penalty for the security priorities, wherein a security priority comprises a security constraint and a priority of the security constraint with respect to other security constraints; determining a performance penalty based on all security constraints of the security priorities by evaluating the source code based on the method as described in the above and in the following; and removing security constraints according to the security priorities until the performance penalty is smaller than the maximal performance penalty.

It also is possible to optimize the code in terms of security and performance. To this end, the method may automatically modify the security constraints until a desired maximal performance penalty is reached.

In particular, the method may receive security priorities, which may be security constraints that are prioritized. I.e., every security constraint may be assigned a priority or priority value, which encodes, whether it is more important than one or more other security constraints. The method then may start to switch security constraints on and off according to the priorities and may determine a performance penalty for the actual switched on security constraints. In such a way, security constraints, which are not so important according to their priorities, may be removed until the secured code reaches the desired maximal performance penalty.

Further aspects of the invention relate to a code security optimization program, which is adapted for performing the method as described in the above and in the following, and to a computer-readable medium on which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a code security optimization system, which may be adapted to perform the method as described in the above and in the following. For example, the code security optimization system may be a PC, on which the code security optimization program is run.

It has to be understood that features of the method as described in the above and in the following may be features of the code security optimization tool and/or the computer program as described in the above and in the following, and vice versa.

According to an embodiment of the invention, the code security optimization system comprises a secure code generator. The secure code generator may be implemented as a software module of the code security optimization program.

The secure code generator may be adapted for: receiving source code and security constraints for the source code, the security constraints encoding, to what extend a variable in the source code is considered secure; generating secure code from the source code and the security constraints by replacing non-secure operations in the source code, which operate on the variables considered as secure, with secure operations; wherein a secure operation is an operation, which, when applied to at least one encrypted variable, generates an encrypted result, which, when decrypted, is the result of the non-secure operation applied to the not encrypted variable.

According to an embodiment of the invention, the code security optimization system comprises a secure code evaluator. The secure code evaluator may be implemented as a software module of the code security optimization program.

The secure code evaluator may be adapted for: receiving source code, security constraints for the source code, and input data for the source code; generating not secure code from the source code; generating secure code from the source code and the security constraints with the secure code generator; and executing the not secure code and the secure code on the input data and determining a performance penalty of the security constraints by comparing the runtime of the not secure code and the secure code.

According to an embodiment of the invention, the code security optimization system comprises a secure code optimizer. The secure code optimizer may be implemented as a software module of the code security optimization program.

The secure code optimizer may be adapted for: receiving source code, security priorities for the source code, input data for the source code and a maximal performance penalty for the security priorities, wherein a security priority comprises a security constraint and a priority of the security constraint with respect to other security constraints; determining a performance penalty based on all security constraints of the security priorities by evaluating the source code with the secure code evaluator; and removing security constraints according to the security priorities until the performance penalty is smaller than the maximal performance penalty.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
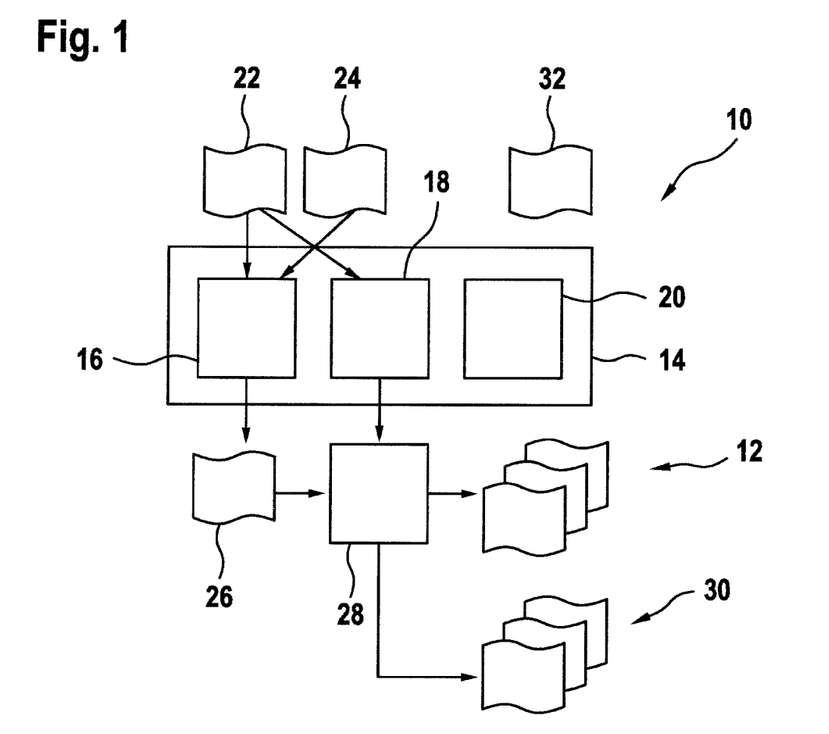
FIG. 1 schematically shows a code security optimization system according to an embodiment of the invention.

FIG. 1 shows a tool or system 10, which is adapted for generating secure code 12. The system 10, which may comprise a computer program 14 executed on a PC or other similar computing device, comprises several modules 16, 18, 20, which support a software engineer by generation, evaluating and optimizing secure code 12.

The system 10 comprises a secure code generator 16, which is adapted for receiving source code 22 and security constraints 24 and for generating an intermediate secure code 26 based on the security constraints 24. The source code 22 may be or may comprise one or more source code files, usually text files. Also the security constraints 24 may be provided by one or more files, such as a text file and/or an XML file.

For example, the intermediate secure code 26 may be a modified source code.

The system 10 furthermore may comprise a compiler 28, which is adapted for compiling the intermediate source code 26 into executable secure code 12, which may be byte code or machine code, which directly may be executed by a virtual machine or a processor. Alternatively, it may be possible that the executable secure code is directly generated by the secure code generator 16.

Furthermore, the system 10 comprises a secure code evaluator 18 adapted for analysing the secure code 12 generated by the secure code generator 16. The secure code evaluator may generate not secure or ordinary code 30 from the source code 22, for example with the aid of the compiler 28, and/or may determine a performance penalty for the runtime of the secure code 12 with respect to the not secure code 30.

Furthermore, the system 10 comprises a secure code optimizer 20 adapted for optimizing the secure code 12. The secure code optimizer may receive security priorities 32 and based on these security priorities 32 may generate security constraints 24 and optimized secure code 12, which may have a defined performance penalty.

It may be possible that the system 10 is command line based, that all modules 16, 18, 20 are executed based on a command line, and/or that the input and output of the modules is text based or performed via files.

Furthermore, it may be possible that the system 10 is part of a graphical software development environment, in which, for example, the source code may be edited. Then it may be possible that the security constraints 24 and the security priorities 32 are stored otherwise in the system 10. For example, the constraints 24 and priorities 32 may be edited and displayed directly besides the variables and/or control structures of the source code, editable in an editor window and/or shown in a code inspection window.

Also the output of the modules 16, 18, 20, such as specific information about secured variables and control structures as well as performance penalties of the securing with respect to specific source code blocks, such as operations and/or control structures, may be displayed in the editor window and/or the code inspection window.

Figure 2:
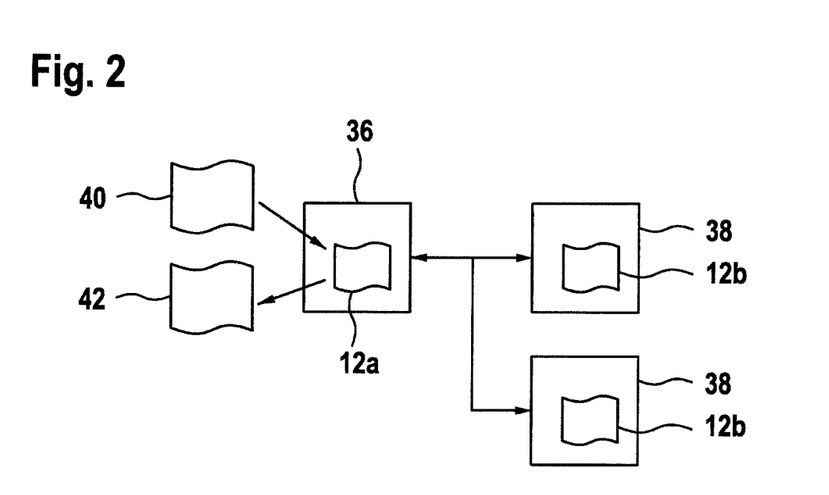
FIG. 2 schematically shows a distributed system for running secure code generated with the system of FIG. 1.

FIG. 2 shows a system 34 adapted for executing the secure code 12 and the not secure code 30. Usually, the secure code 12 comprises a client part 12a to be executed on a client 36 and one or more server parts 12b to be executed on one or more servers 38. For example, when the secure code 12 is based on homomorphic encryption, the server part 12b may be executed on one server. When the secure code 12 is based on multi-party encryption, the secure part may comprise two different server parts 12b.

When the secure code 12 is executed on the system 34, the client part 12b may receive input data 40, may encrypt variables in the input data 40, which are considered as secure, and may send the at least partially encrypted input data 40 to a server 38. In the case of multi-party encryption, the client also may send encryption keys to the other server 38.

The server part 12b receives the at least partially encrypted input data 40, may process it with secure operations, such as homomorphic operations, and may send the processed data back to the client 36.

The client part 12a may decrypt the processed data into result data 42.

It also may be possible that encrypted intermediate results produced by the server part 12b are sent to the client part 12a, which, for example, may evaluate conditions of control structures and may generate encrypted variables based on this that are used to control the control flow of the server part 12b.

When the secure code 12 is executed in "real", i.e. on business data, the client 36 may be provided by a secure device, such as a computing device of a first party owning the secure code 12. The one or more server 38 may be provided by a cloud computing facility with high computing power, which may be considered as unsecure. The servers 38 and the client 36 may be communicatively connected via Internet.

When the secure code 12 is executed for a test, such as a performance test, for example by the code evaluator 18, the system 34 also may be provided virtually in one computing device, for example, a computing device also executing the code generation, evaluation and optimization system 10.

Figure 3:
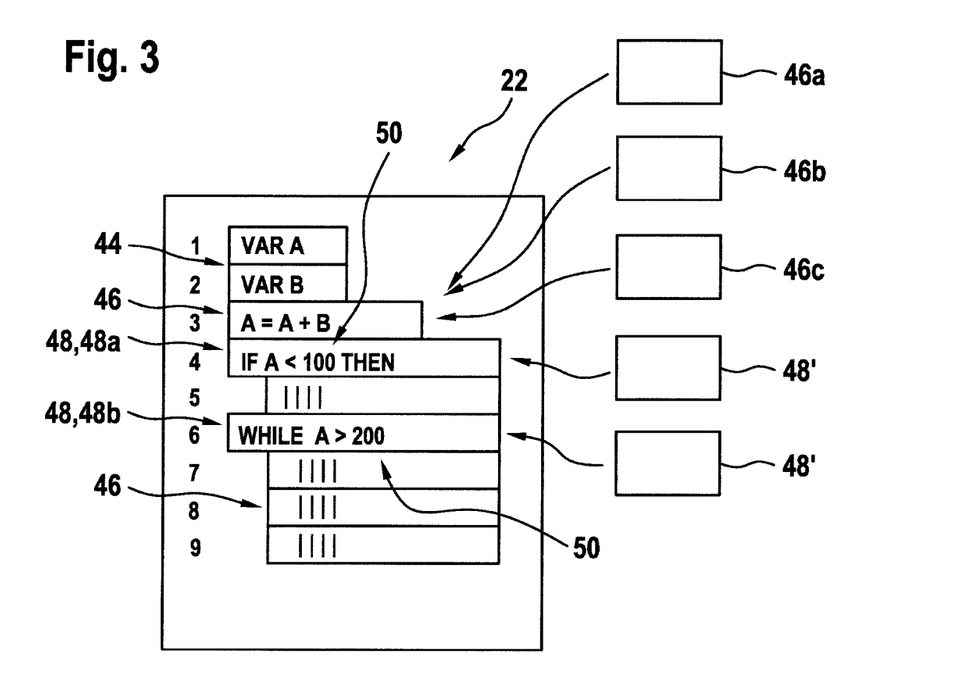
FIG. 3 schematically shows source code used by the system shown in FIG. 1.

FIG. 3 schematically shows source code 22. The source code 22, usually provided in a text file and/or editable and readable by a human being, encodes variables 44, operations 46 on the variables and control structures 48, which may branch according to conditions 50. The control structure 48a is a "if then else" structure with a then-clause executed, if the condition is true and an else-clause (not shown), if the condition is false.

The control structure 48b is a repeating control structure, which repeats a block of operations, while the corresponding condition 50 is true.

During the generation of secure code, operations 46 on the variables 44 may be replaced with secure operations 46a, obfuscated operations 46b, and confidentiality domain operations 46c as explained in the above and in the following. Control structures 48 may be replaced with secure control structures 48' as explained in the above and in the following.

Figure 4:
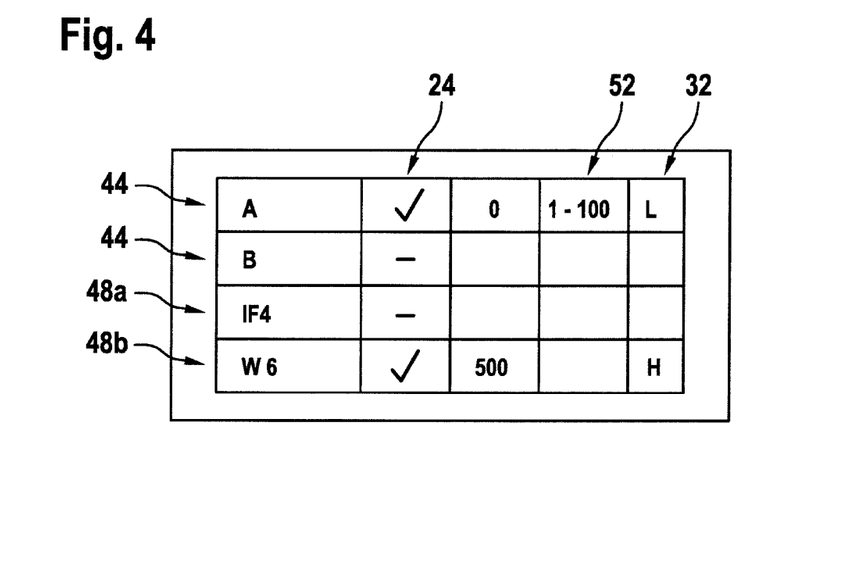
FIG. 4 schematically shows security constraints used by the system shown in FIG. 1.

FIG. 4 schematically shows security constraints 24 and security priorities 32.

Some of the variables 44, such as "A" and/or some of the control structures 48, such as 48b, may be considered as secure. In this case, the security constraint 24 relating to the variable "A" and/or the control structure 48b may have a flag that indicates that the variable "A" is considered secure. A secure repeating control structure 48b also may have a security constraint 24, which indicates, how often the control structure 48b should be repeated, until the condition is evaluated by the client 36 (see below).

Furthermore, operations performed on some of the variables 44, such as "A", should be obfuscated. Thus, the security constraint 24 relating to the variable "A" may have a flag that indicates that operations on the variable "A" should be obfuscated.

A further possibility is that the security constraint 24 relating to a variable 44 encodes a confidentiality domain 52 for the variable 44. A confidentiality domain 52 may comprise one or more ranges for the variable 44, in which the variable 44 is to be considered as secure. In the case, the value of the variable 44 is in the confidentiality domain 52, then secure operations 46a have to be executed on the variable 44. Otherwise, the variable 44 may be processed in plaintext, i.e. unencrypted.

The secure code optimizer 20 also needs security priorities 32, which may indicate, how important a security constraint is. For example, the security priorities 32 may be provided simply with "high" and low". It also may be possible that the priorities are provided with numbers, which indicate the priority level and/or with relationships between the security constraints 24, indicating, which security constraint 24 is more important than another.

Figure 5:
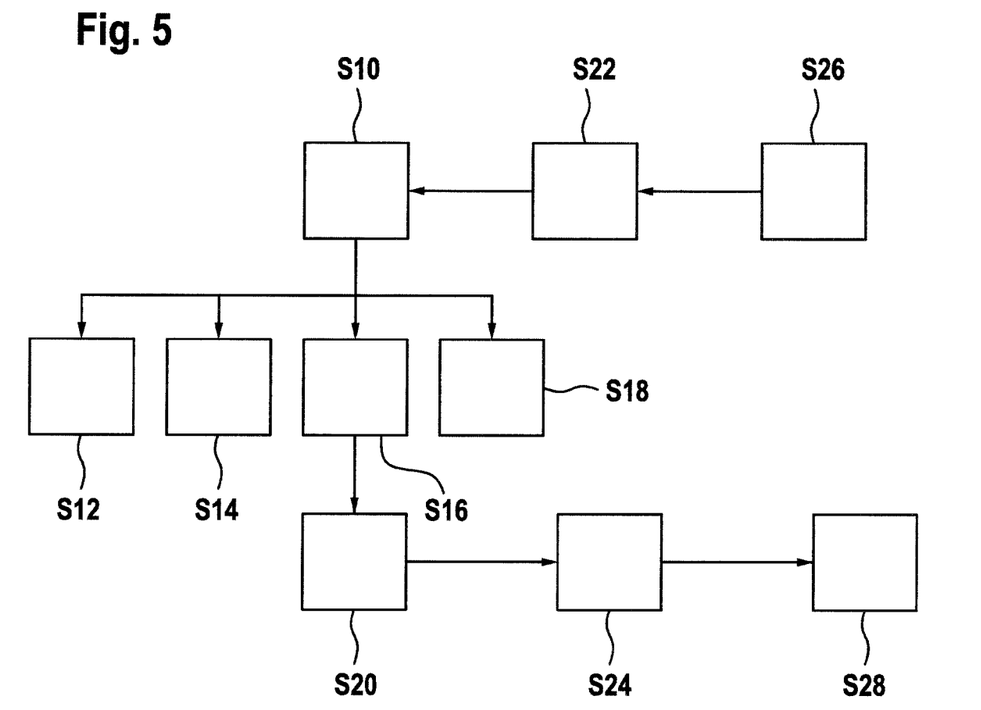
FIG. 5 shows a flow diagram for a method for automatically generating secure code according to an embodiment of the invention.

FIG. 5 shows a flow diagram for automatically generating secure code 12, 26 with the secure code generator 16, for evaluating secure code 12 with the secure evaluator 18 and for optimizing secure code with the secure code optimizer 20.

Steps S10 to S20 may be performed by the secure code generator 16.

In step S10, the secure code generator 16 receives source code 22 and security constraints 24. For example, the source code 22 may be based on C# ©, Java©, C++ ©, etc.

The security constraints 24 encode different levels of confidentiality for the secure code 12 to be generated and/or the data 40, 42 processed by the secure code 12. The security constraints 24 may encode, whether a variable 44 in the source code 22 is considered secure, and/or to what extent the variable 44 in the source code 22 is considered secure. For example, each variable 44 with input data may be assigned a different confidentiality level. Furthermore, a confidentiality domain 52 may be assigned to the variable 44.

The security constraints 24 also may encode, whether operations 46 executed on variables 44 considered as secure are to be obfuscated, and/or whether a control structure 48 in the source code 22 is considered secure.

In steps S12 to S16, the secure code generator generates secure code 26 from the source code 22 based on the security constraints. This may take place by replacing unsecure code blocks, such as operations 46 and control structures 48 with secure ones 46a, 46b, 46c, 48'. An unsecure code block may be a code block written without reference to security and obfuscation, and may be seen as an ordinary code block. A secure code block, such as a secure or obfuscated operation 46a, 46b, 46c and/or a secure control structure 48' may be a code block that calls secure functions, i.e. functions performing operations on encrypted data.

In step S12, the secure code generator 16 replace a non-secure operation 46 in the source code 22, which operate on one or more variables 44 considered as secure, with a secure operation 46a.

A secure operation. 46a may be an operation, which, when applied to at least one encrypted variable 44, generates an encrypted result, which, when decrypted, is the result of the non-secure operation 46 applied to the not encrypted variable 44.

As an example, the addition a+b may be the non-secure operations. It has to be noted that an operation may have more than one argument, and in this case, when one of the arguments, such as the variable a, is to be considered as secure, the operation 46, such as addition, may have to be replaced with a secure operation 46a.

For example, when the secure operation is 46a are based on homomorphic encryption, the client part 12a may comprise code for encrypting both variables a and b to ENC(a) and ENC(b), the server part 12b may comprise code for homomorphic addition $result_H=ENC(a)+_H ENC(b)$ and the client part 12a may comprise code for decrypting the result $ENC^{-1}(result_H)$.

It also may be that the secure operation 46a is based on multi-party encryption. In this case, the client part 12a may comprise code for encrypting both variables a and b to $ENC_K(a)$ and $ENC_L(b)$, with two keys K, L. A first server part 12b to be executed on a first server 38 may comprise code to add the two variables $r_1=ENC_K(a)+ENC_L(b)$. A second server part may comprise code to add the keys $r_2=K+L$. The client part 12a may comprise code for decrypting the result $ENC^{-1}_{r_2}(r_1)$.

In step S14, the secure code generator 16 replaces a non-secure operation 46 in the source code 22, which operate on a variable 44 with a confidentiality domain 52, with a confidentiality domain operation 46c. A confidentiality domain 52 comprises a range or several ranges, in which the corresponding variable 44 is considered secure. Using explicit confidentiality domains 52 for variables 44, which may be subsets of their entire value range, may reduce performance penalties due to security. For instance, a temperature measurement may only have to be kept confidential, if it is outside the common range.

A confidentiality domain operation 46c may comprise the non-secure operation 46 and a corresponding secure operation 46a and the confidentiality domain operation 52 may be adapted to request from a client 36, adapted for decrypting the variable 44, whether the variable 44 is in the confidentiality domain and in this case may execute the secure operation on the encrypted variable. Otherwise, when the variable is not in the confidentiality domain 52, the non-secure operation 46 may be performed on the decrypted variable 44.

For example, the client part 12a for encrypting the variable 44 and the one or more server parts 12b may be provided as described with respect to step S12. This code may be supplemented with further operations, such as

```
if( isInConfidentialityDomain(a) ) then
    encOperation(a)
else
    encrypt( operation( decrypt(a) )
``` isInConficlentialityDomain may be a function, in which a is sent from the server 38 to a client 36 or another client adapted to decrypt the variable a, which then tests, whether the variable is in the confidentiality domain 52, and sends the result back to the server 38. In the case of multi-party encryption, the client also may be the other server.

encOperation is the encrypted operation 46a, for example, as described with respect to step S12.

With encrypt(operation(decrypt(a)), the variable a may be decrypted, for example by the client, the non-secure operation 46 may be performed by the server and optionally the result may be encrypted again, for example by the client.

Usually, the operation 46 "operation" will not be one single operation as addition, but may be a longer sequence of elementary operations, which may have a high performance penalty, when provided in secure form.

In step S16, the secure code generator 16 replaces a not obfuscated operations 46 in the source code 22 with an obfuscated operation 46b, when this is encoded in the security constraints 24.

An obfuscated operation 46b is an operation, which, when applied to input variables of the not obfuscated operation 46 and an additional encrypted input variable, generates a same result as the not obfuscated operation 46 for a special value of the additional input variable.

For example, the not obfuscated operation 46 may be the multiplication with a number, such as a=a*2. To hide the algorithm behind the calculation, the not obfuscated operation 46 is replaced with an obfuscated operation 46b, that depends on an additional input variable p, for example a=p*2*a+(1−p)*2*a. When the variable p is set to 1, this expression reduces to the not obfuscated operation. In general, the value of p may be less trivial, such as 0.1234, and/or the polynomial used for obfuscation may be more complicated.

More general, when an operation 46, such as c=a*b, is to be obfuscated, misleading and/or junk operations, such as a+b, d*f, may be generated, and an additional encrypted input variables v may be used, to select the correct result. For example, in the case of n junk operations, n additional encrypted variables may be used. For example, for a*b, and the two junk operations a+b, d*J; two encrypted binary variables v0, v1 may be used and the obfuscated operation 46a may look like $$temp=v0*a*b+(1-v0)*(a+b)$$

$$c=v1*temp+(1-v1)*(d*f)$$

The operations, such as multiplication and addition, used in the obfuscated operation 46b also have to be replaced at least partially with secure operation 46a, such that a third party cannot guess the algorithm based on known values of the input and output variables.

The client part 12a for encrypting the variables 44 and the additional variable, such as a and p, and the used secure operations 46a for the one or more server parts 12b may be provided as described with respect to step S12. Furthermore, the client part 12a may have knowledge about the correct value of the additional input variable and may provide it in encrypted form to the server part 12b.

In step S18, the secure code generator 16 replaces a not secured control structure 48 in the source code 22 considered as secure, with a secure control structure 48'. As already mentioned above, a control structure is based on a condition 50, which in general may result in true or false. The value of the condition influences the branching of the control structure, 48, i.e. which part or code block or operation of the control structure is executed next.

For a secure control structure 48, the condition 50 or a value for the condition 50, may be determined in encrypted form, with secure operations 46a, for example as described with respect to step S12. The secure control structure 48' may additionally be based on the encrypted condition 50 of the variable 44.

For example, when the condition 50 is a<100, the server part 12b may compute c=a−100 and the secure control structure additionally may be based on c. Furthermore, the client part 12a may decrypt c, may determine the condition c<0, may decrypt the condition and may provide the result to the server part 12b. For example the encrypted condition may be an encrypted value of 1, when the condition 50 is true or may be an encrypted value of 0, when the condition is false.

For example, the secure control structure 48' may comprise a code block generating a result, which result is multiplied in secure form with the encrypted condition 50.

In general, in the case of a control structure, the security may be optimized by varying the number of performed iterations of repeating control structures 48b and the choice of which if-then-else control structures 48a to secure and/or how to secure them.

When the control structure 48a is an "if then else" structure. The secure control structure 48' may be generated by multiplying a then-clause with the encrypted condition 50 and/or an else-clause with an encryption of 1 minus the condition 50.

For example if(cond($a$)) then $a$=operation1($a$) else $a$=operation2($a$)

may be replaced with $a$=encOperation1($a$)*$p$+encOperation2($a$)*(1−$p$)

where p is the encrypted condition 50, which may have been evaluated by the client part 12a. encOperation1, encOperation2 are the corresponding encrypted operations for operation1 and operation2. The other operations 46, such as multiplication and addition, used in the secured control structure 48' also have may have to be replaced with secure operations 46a.

When the control structure 48b is a repeating control structure adapted for repeating an operation 46, when the condition 50 is true, the corresponding security constraint 24 may encode, how often the operation 46 is repeated, until a request to the client 36 is sent, which evaluates the condition.

The secured repeating control structure 48' May send a request to a client 36, adapted for decrypting the condition 50, and adapted for deciding, whether the repeating control structure 48' should be stopped.

An example for a repeating control structure 48b is while( condition(a) )
  a=operation(a, b)

The corresponding secure repeating control structure 48', which replaces the above control structure 48b, may be repeat
  a=encOperation(a, b, condition(a) )
  if(iter++==nextCheck)
    if( shouldStop( condition(a) ) ) break else nextCheck+=offset In the secure version, the variables a and b are encrypted. The non-secure operation operation is replaced with a secure operation encOperation. The exit condition condition, which is determined in encrypted form, is evaluated with a call to a client named shouldStop, which is only called, when a specific or random amount of repetitions have been performed.

The secure repeating control structure 48' does not reveal how often exactly the operation 46 to be repeated is executed until a condition 50 is satisfied. It may execute a modified version of the operation to be repeated for a constant and or random number of times regardless of the input. Thus, an adversary or third party may only get an approximate value of the number of times the repeating control structure 48b is executed and which condition 50 led to an exit of the repeating control structure 48b. As a consequence, the adversary may only derive estimates of possible variable values.

The encrypted operation 46a to be repeated encOperation may be additionally based on the encrypted condition 50. The encrypted condition 46a may generate the same encrypted result as the operation operation to be repeated, when the condition 50 is true, and the encrypted condition 46a may not change input variables, when the condition 50 is false.

For example, encOperation($a,b$,condition($b$))=operation($a,b$)*condition($a$)+$a$*(1−condition($a$))

wherein the operations in the non-secure operation operation as well as the additions and multiplications may be replaced with corresponding secure ones. When the decrypted value of condition(a) is 1, when the condition is true and is 0, when the condition is false, the above behaviour is reproduced.

Steps S12 to S18 may be repeated until all operations 46 and control structures 48 are replaced with the corresponding secure ones 46a, 46b, 46c, 48' as demanded by the security constraints 24. The result may be intermediate secure code 26, which also may be in the form of source code but with replaced operations and control structures. The intermediate secure code 26 may be displayed in an editor window or code inspection window for the source code 22 and/or may be output into a file.

In step S20, the intermediate secure code 26 is compiled to executable secure code 12. Alternatively, the executable secure code 12 may be directly generated by the secure code generator 16.

Steps S22 and S24 additionally may be performed by the secure code evaluator 18.

In step S22, the secure code evaluator 18 receives source code 22, security constraints 24 and input data 40 and inputs the source code 22 and the security constraints 24 into the secure code generator 16, which in steps S10 to S20 generates secure code 12.

Besides this, in step S22, the secure code evaluator 18 generates ordinary, not secure code 30 from the source code 22, for example by inputting the source code 22 into the compiler 28.

In step S24, the secure code evaluator 18 executes the not secure code 30 and the secure code 22 on the input data 40, for example as describe with respect to FIG. 2, and determines a performance penalty of the security constraints 24 by comparing the runtime of the not secure code 30 and the secure code 22.

The runtime of executable code 22, 30 may be the time difference between the start and the finish of the execution of the code 22, 30. A performance penalty for the security constraints 24 may be the difference between the runtime of the not secure code 30 and the secure code 30. However, a performance penalty also may be a factor determined by dividing the runtime of the secure code 12 by the runtime of the not secure code 30.

It has to be noted that not only an overall performance penalty may be determined for the complete source code 22, but also for parts, i.e. code blocks, of it. For example, a performance penalty may be determined for a control structure, blocks of the source code, such as nested control structures, individual operations, procedure, etc. The overall performance penalty and/or the performance penalties for code blocks may be displayed in an editor window or code inspection window for the source code 22 and/or may be output into a file.

In such a way, the code complexity, impact of changes of code on security, security of specific control structures may be shown by the secure code evaluator 18. This may enable and simplify tuning of secure code solutions automatically found with the secure code generator 16 and may enable verifying their correctness and security guarantees.

Furthermore, the secure code evaluator may show propagation of security constraints 24. This may enable a user to see what implications it has when he assigns a security constraint 24 to the source code 22. For example, it may be shown which other variables 44 need to be treated specially as a consequence of adding the security constraint 24 to a variable 44.

Steps S26 and S28 additionally may be performed by the secure code optimizer 20.

In step S26, the secure code optimizer 20 receives source code 22, security priorities 32, input data 40 and a maximal performance penalty which also may be provided as a runtime difference or a slowdown multiplier, i.e. a factor.

With this data, the secure code optimizer starts to recursively reduce a set of security constraints 22 for reducing the runtime of the secure code 12. Every security priority 32 may comprise a security constraint 24 and a priority value of the security constraint 24 with respect to other security constraints 24 (see description of FIG. 4).

The secure code optimizer 20 starts with all security constraints 24 provided by the security priorities 32 and determines a performance penalty based on these constraints 24 of the security priorities 32 by transmitting the source code 22, the generated constraints 24 and the input data 40 to the secure code evaluator 18, which evaluates the source code 22 as described with respect to steps S22 to S24.

In step S28, when the performance penalty determined by the secure code evaluator 18 is higher than the maximal performance penalty, the secure code generator 20 removes security constraints 24 according to the security priorities 32.

For example, this may be done by a tree search, which uses a tree that has been built from the security priorities 32. I.e. the root node of the tree may be the maximal set of security constraints 24 and a child node may have the security constraints of its parent node reduced by one security constraint, when this reduction is allowed by the security priorities.

With this reduced set of security constraints 24, a next performance penalty is determined as described with respect to step S26.

In the end, a set of constraints 24 may be reached that result in a performance penalty smaller than the maximal performance penalty in such a way that the secure code 12 is maximal secure, while having a runtime smaller as demanded by the maximal performance penalty with respect to the test input data 40.

In such a way, secure code solutions may be automatically computed that minimize the revealed information given constraints on a maximal performance penalty, i.e. a performance overhead due to security and confidentiality priorities. Depending on the required level of security, the secure code optimizer 20 may produce different encrypted versions of the same source code 22, which then may be automatically benchmarked and compared with each other in order to choose the right level of security.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 code security optimization system
12 secure code
12a client part of secure code
12b server part of secure code
14 program/tool
16 secure code generator
18 secure code evaluator
20 secure code optimizer
22 source code
24 security constraints
26 intermediate secure code
28 compiler
30 ordinary, not secure code
32 security priorities
34 execution system for secure code
36 client
38 server
40 input data
42 result data
44 variable
46 operation
46a secure operation
46b obfuscated operation
46c confidentiality domain operation
48 control structure
48a "if then else" control structure
48b repeating control structure
48' secure control structure
50 condition
52 confidentiality domain

The invention claimed is:

1. A method of automatically generating secure code, the method comprising:
receiving source code and security constraints for the source code, the security constraints encoding, to what extent a variable of variables in the source code is considered secure;

generating secure code from the source code and the security constraints by replacing non-secure operations in the source code, which operate on the variables considered as secure, with secure operations;

wherein a secure operation is an operation, which, when applied to at least one encrypted variable, generates an encrypted result, which, when decrypted, is the result of the non-secure operation applied to the not encrypted variable;

wherein the security constraints encode a confidentiality domain for at least one of the variables in the source code;

wherein, when generating secure code, an operation in the source code, which operates on the at least one variable of the variables in the source code with a confidentiality domain is replaced with a confidentiality domain operation;

wherein a confidentiality domain operation comprises the non-secure operation and a corresponding secure operation, wherein the secure code comprises a client part to be executed on a client, wherein the client part is adapted for receiving input data, updating the input data by encrypting a portion of variables in the input data, which variables are considered as secure, and to send partially encrypted input data to a server, wherein the secure code comprises a server part to be executed on at least one server, wherein the server part is adapted to receive the partially encrypted input data, to process the partially encrypted input data based on the secure operations and to send the processed data back to the client, and wherein the client part is adapted for decrypting the processed data into result data.

2. The method of claim 1,
wherein the security constraints encode, whether operations executed on variables considered as secure are to be obfuscated;

wherein, when generating secure code, not obfuscated operations in the source code which operate on the variables considered as secure, with obfuscated operations;

wherein an obfuscated operation is an operation, which, when applied to input variables of the not obfuscated operation and an additional encrypted input variable, generates a same result as the not obfuscated operation for a special value of the additional input variable.

3. The method of claim 2,
wherein the security constraints encode, whether a control structure in the source code is considered secure, a control structure being adapted for executing a part of a code based on a condition on a variable;

wherein, when generating secure code, a not secured control structure in the source code considered as secure, is replaced with a secure control structure, the secured control structure additionally being based on the encrypted condition of the variable.

4. The method of claim 3,
wherein the control structure is an "if then else" structure and the secure control structure is based on multiplying a then-clause with the encrypted condition and/or an else-clause with an encryption of 1 minus the condition.

5. The method of claim 1,
wherein the security constraints encode, whether a control structure in the source code is considered secure, a control structure being adapted for executing a part of a code based on a condition on a first variable of the variables in the source code;

wherein, when generating secure code, a not secured control structure in the source code considered as secure, is replaced with a secure control structure, the secured control structure additionally being based on the encrypted condition of the first variable.

6. The method of claim 5,
wherein the control structure is an "if then else" structure and the secure control structure is based on multiplying a then-clause with the encrypted condition and/or an else-clause with an encryption of 1 minus the condition.

7. The method of claim 6,
wherein the control structure is a repeating control structure adapted for repeating an operation, when the condition is true;

wherein the secured repeating control structure sends a request to a client, adapted for decrypting the condition, and adapted for deciding, whether the repeating control structure should be stopped;

wherein the security constraints encode, how often the operation is repeated, until the request to the client is sent.

8. The method of claim 7,
wherein the encrypted control structure is repeating an encrypted operation, the encrypted operation being based additionally on the encrypted condition, wherein the encrypted operation generates a same result as the operation to be repeated, when the condition is true, and the encrypted condition not changing input variables, when the condition is false.

9. The method of claim 5,
wherein the control structure is a repeating control structure adapted for repeating an operation, when the condition is true;

wherein the secured repeating control structure sends a request to a client, adapted for decrypting the condition, and adapted for deciding, whether the repeating control structure should be stopped;

wherein the security constraints encode, how often the operation is repeated, until the request to the client is sent.

10. The method of claim 9,
wherein the encrypted control structure is repeating an encrypted operation, the encrypted operation being based additionally on the encrypted condition, wherein the encrypted operation generates a same result as the operation to be repeated, when the condition is true, and the encrypted condition not changing input variables, when the condition is false.

11. The method of claim 1,
wherein the confidentiality domain operation is adapted to request from a client adapted for decrypting the variable, whether the variable is in the confidentiality domain and in this case for executing the secure operation on the encrypted variable and otherwise for executing the non-secure operation on the decrypted variable.

12. The method of claim 1,
wherein the secure code is a source code, a byte code or a machine code.

13. The method of claim 1,
wherein the secure operations are based on homomorphic encryption.

14. The method of claim 1,
wherein the secure operations are based on multi-party encryption.

15. A method for evaluating source code to be secured, the method comprising:
receiving source code, security constraints for the source code, and input data for the source code;
generating not secure code from the source code;
generating secure code from the source code and the security constraints according to claim 1;
executing the not secure code and the secure code on the input data and determining a performance penalty of the security constraints by comparing the runtime of the not secure code and the secure code.

16. A code security optimization program adapted for performing the method of claim 1.

17. A method for generating optimized secure code, the method comprising:
receiving source code, security priorities for the source code, input data for the source code and a maximal performance penalty for the security priorities, wherein a security priority comprises a security constraint and a priority of the security constraint with respect to other security constraints;
generating not secure code from the source code;
generating secure code from the source code and the security constraints by replacing non-secure operations in the source code, which operate on the variables considered as secure, with secure operations;
executing the not secure code and the secure code on the input data and determining a performance penalty of the security constraints by comparing the runtime of the not secure code and the secure code; and
removing security constraints according to the security priorities until the performance penalty is smaller than the maximal performance penalty,
wherein a secure operation is an operation, which, when applied to at least one encrypted variable, generates an encrypted result, which, when decrypted, is the result of the non-secure operation applied to the not encrypted variable;
wherein the security constraints encode a confidentiality domain for at least one of the variables in the source code;
wherein, when generating secure code, an operation in the source code, which operates on the at least one variable of the variables in the source code with a confidentiality domain is replaced with a confidentiality domain operation;
wherein a confidentiality domain operation comprises the non-secure operation and a corresponding secure operation,
wherein the secure code comprises a client part to be executed on a client,
wherein the client part is adapted for receiving input data, updating the input data by encrypting a portion of variables in the input data, which variables are considered as secure, and to send the partially encrypted input data to a server,
wherein the secure code comprises a server part to be executed on at least one server, wherein the server part is adapted to receive the partially encrypted input data, to process the partially encrypted input data based on the secure operations and to send the processed data back to the client, and
wherein the client part is adapted for decrypting the processed data into result data.

18. A code security optimization system, comprising:
a non-transitory computer readable medium including a set of instructions structured to be executed by a computing device, the set of instructions including a secure code generator module, a secure code evaluator module, and a secure code optimizer module,
wherein the secure code generator module is configured for: receiving source code and security constraints for the source code, the security constraints encoding, to what extent a variable of variables in the source code is considered secure, and generating secure code from the source code and the security constraints by replacing non-secure operations in the source code, which operate on the variables considered as secure, with secure operations,
wherein a secure operation is an operation, which, when applied to at least one encrypted variable, generates an encrypted result, which, when decrypted, is the result of the non-secure operation applied to the not encrypted variable,
wherein the security constraints encode a confidentiality domain for at least one of the variables in the source code,
wherein, when generating secure code, an operation in the source code, which operates on the at least one variable of the variables in the source code with a confidentiality domain is replaced with a confidentiality domain operation;
wherein a confidentiality domain operation comprises the non-secure operation and a corresponding secure operation;
wherein the secure code evaluator module is configured for: receiving source code, security constraints for the source code, and input data for the source code, generating not secure code from the source code, generating secure code from the source code and the security constraints with the secure code generator module, and executing the not secure code and the secure code on the input data and determining a first performance penalty of the security constraints by comparing the runtime of the not secure code and the secure code,
wherein the secure code optimizer module is configured for: receiving source code, security priorities for the source code, input data for the source code and a maximal performance penalty for the security priorities, wherein a security priority comprises a security constraint and a priority of the security constraint with respect to other security constraints, determining a second performance penalty based on all security constraints of the security priorities by evaluating the source code with the secure code evaluator module, and removing security constraints according to the security priorities until the second performance penalty is smaller than the maximal performance penalty,
wherein the secure code comprises a client part to be executed on a client,
wherein the client part is adapted for receiving input data, updating the input data by encrypting a portion of variables in the input data, which variables are considered as secure, and to send the partially encrypted input data to a server,
wherein the secure code comprises a server part to be executed on at least one server, wherein the server part is adapted to receive the partially encrypted input data, to process the partially encrypted input data based on the secure operations and to send the processed data back to the client, and wherein the client part is adapted for decrypting the processed data into result data.

\* \* \* \* \*